US006731829B2

(12) United States Patent
Ionov

(10) Patent No.: US 6,731,829 B2
(45) Date of Patent: May 4, 2004

(54) TRUE-TIME ALL-OPTICAL DELAY GENERATOR FOR ARRAY BEAM STEERERS

(75) Inventor: Stanislav I. Ionov, Calabasas, CA (US)

(73) Assignee: HRL Laboratories, LLC., Malibu, CA (US)

( * ) Notice: Subject to any disclaimer, the term of this patent is extended or adjusted under 35 U.S.C. 154(b) by 176 days.

(21) Appl. No.: 09/738,584

(22) Filed: Dec. 16, 2000

(65) Prior Publication Data

US 2004/0062469 A1 Apr. 1, 2004

(51) Int. Cl.[7] .................................................. G02B 6/26
(52) U.S. Cl. ........................... 385/15; 385/31; 398/199; 398/201
(58) Field of Search ............................ 385/15, 2, 3, 4, 385/8, 9, 10, 37, 31; 398/199, 201

(56) References Cited

U.S. PATENT DOCUMENTS

| | | | |
|---|---|---|---|
| 3,731,103 A | | 5/1973 | O'Meara ...................... 250/199 |
| 4,588,957 A | | 5/1986 | Balant et al. ................. 330/4.3 |
| 4,834,474 A | * | 5/1989 | George et al. .................. 359/8 |
| 4,937,539 A | | 6/1990 | Grinberg et al. |
| 4,940,303 A | | 7/1990 | Abeles et al. |
| 5,109,449 A | * | 4/1992 | Newberg et al. ........ 250/227.11 |
| 5,128,687 A | * | 7/1992 | Fay .............................. 342/376 |
| 5,233,673 A | | 8/1993 | Vali et al. |
| 5,526,170 A | * | 6/1996 | Esman et al. ................. 356/318 |
| 5,530,778 A | | 6/1996 | Rast .............................. 385/24 |
| 5,623,360 A | | 4/1997 | Gesell et al. ................. 359/287 |
| 5,793,907 A | * | 8/1998 | Jalali et al. .................. 359/130 |
| 5,809,186 A | | 9/1998 | Miller |
| 5,818,386 A | * | 10/1998 | Belisle ......................... 342/157 |
| 5,856,805 A | * | 1/1999 | Page ............................ 342/375 |
| 5,859,611 A | * | 1/1999 | Lam et al. ................... 342/368 |
| 5,977,911 A | * | 11/1999 | Green et al. ................. 342/157 |
| 6,137,442 A | * | 10/2000 | Roman et al. ............... 342/375 |
| 6,337,660 B1 | * | 1/2002 | Esman et al. ................ 342/375 |

OTHER PUBLICATIONS

Corral, J.L., et al., "Optical Beamforming Network Based on Chirped Fiber Gratings Continuously Variable True–Time–Delay Lines," *Microwave Symposium Digest, 1998 IEEE*, pp 1379–1382 (Jun. 1998).

Tulchinsky, David A., et al., "Fiber–Optic Control of a Time–Steered Millimeter–Wave Transmit Array," *Microwave Photonics, 1999 IEEE*, pp 279–282 (Nov. 1999).

Atia, Walid A., et al. "Demonstration of Return–to–zero Signaling in Both OOK and DPSK Formats to Improve Receiver Sensitivity in an Optically Preamplified Receiver"; IEEE; pp. 226–227 (1999).

(List continued on next page.)

*Primary Examiner*—Frank G. Font
*Assistant Examiner*—Kaveh C Kianni
(74) *Attorney, Agent, or Firm*—Ladas & Parry

(57) ABSTRACT

A true-time delay generator for multiple aperture optical beam steering devices. The generator comprises a spectrum spreading element, a dispersive element, and a plurality of tunable optical filters. The spectrum broadening element broadens the spectrum of optical pulses provided to the element. The dispersive element imparts a chirp to the wavelengths within the spectrum of the optical pulses. As a result of the chirp, the wavelengths acquire differing delays. The chirped pulses are then simultaneously sent to the plurality of tunable filters, where each filter is set to transmit only a single spectral component from each pulse. Since the spectral components have differing delays, the outputs from the filters are pulses with differing arrays. These delays are controlled such that when the pulses are sent to multiple apertures in an optical beam steering device, the pulses will be synchronized when received at a receive point.

39 Claims, 4 Drawing Sheets

OTHER PUBLICATIONS

Corral, J.L., et al., "Continuously Variable True Time–Delay Optical Feeder for Phased–Array Antenna Employing Chirped Fiber Gratings"; *IEEE Photonics Technology Letters*, vol. 45, No. 8; pp. 1531–1536 (Aug. 1997).

Corral, J.L., et al., "True–Time–Delay Scheme for Feeding Optically Controlled Phased–Array Antennas Using Chirped–fiber Gratings", *IEEE Photonics Technology Letters*, vol. 9, No. 11, pp. 1529–1531 (Nov. 1997).

Winzer, Peter J.; "Sensitivity Enhancement of Optical Receivers by Impulsive Coding"; *Journal of Lightwave Technology*, vol. 17, No. 2; pp. 171–177 (Feb. 1999).

* cited by examiner

TRUE-TIME ALL-OPTICAL DELAY GENERATOR FOR ARRAY BEAM STEERERS

FIELD OF THE INVENTION

The present invention relates to optical true-time delay generation. More specifically, the present invention relates to true-time delay generation for multiple aperture optical beam steering devices.

BACKGROUND OF THE INVENTION

Optical beam steering is often required where information from an optical beam must be relayed from one location to another. High data rate, secure laser communications, target designation, and laser radar are a few of the applications in which optical beam steering is required. Optical beam steering may be provided by a single aperture, which directs a light beam in the desired direction.

Devices for single aperture beam steering are well known in the art. Single aperture beam steering can be implemented with electromechanical systems. Such systems generally consist of a mirror mounted on an electrical actuator. These systems provide relatively low losses for the strength of the reflected beam. However, such electromechanical systems are limited to low response frequencies up to the order of 1 KHz. The moving parts of an electromechanical system along with size and weight factors are considered to be major limitations of such a system.

Multiple aperture beam steering devices may be provided by compact arrays of non-mechanical beam deflectors, such as optical micro electromechanical system arrays (O-MEMS) or liquid crystal arrays. The optical signal provided to these devices is generally split into multiple optical signals. The array then actually consists of multiple optical apertures which act to steer and radiate multiple optical signals in a desired direction. However, the application of multiple aperture steering devices for fast optical communications and radar application require precise synchronization of the optical signals at the individual apertures for different pointing angles of the device. This is necessary to avoid signal scrambling due to mixing of non-synchronized outputs emerging from individual emitters.

Synchronization is required since the multiple apertures are generally deployed in a relatively flat plane. Thus, when an optical signal is steered to an angle other than exactly perpendicular to that plane, unsynchronized outputs from the individual apertures do not arrive at a receive point at the same time. This problem is particularly seen when the optical signal comprises pulsed signals. In this case, the optical pulse received from the radiating element furthest from the receive point will lag the pulse received from the closest radiating element. Performance of the optical transmitting system is improved when the individual optical beams are made time-coincident to create a time-coincident optical beam.

Applying a time delay to each optical signal before it is radiated provides the capability to generate an optical beam that is synchronized at a receive point. Controlling the delay of signals from individual transmitting elements is the principle behind beamsteered radio frequency phased array antenna systems well known in the art. Phased array antenna systems employ a plurality of individual antenna elements that are separately excited to cumulatively produce a transmitted electromagnetic wave that is highly directional. In a phased array, the relative phases of the signals provided to the individual elements of the array are controlled to produce an equiphase beam front in the desired pointing direction of the antenna beam. The premise of a true-time delay beamsteered phased array is to steer the array beam by introducing known time delays into the signals transmitted by the individual antenna elements. Accurate beam steering of a pulsed optical beam from individual optical elements similarly requires introducing time delays into the optical signals from individual optical elements to produce an equiphase optical beam front.

True-time delay for optical signal transmission may be achieved by purely electronic means by splitting an information carrying electronics signal into a number of channels equal to the number of optical apertures. The delay required for optical beam steering is then applied to each one of the channels separately. The properly delayed signals then drive electro-optic modulators that control the optical outputs of the corresponding apertures. This electronic approach to true-time delay for optical beam steering requires very sophisticated and fast electronics that increase the cost and complexity of the system.

Optical control systems for producing selected time delays in signals for phased array antennas are well known in the art. Different types of optical architectures have been proposed to process optical signals to generate selected delays, such as routing the optical signals through optical fiber segments of different lengths; using deformable mirrors to physically change the distance light travels along a reflected path before transmission; and utilizing free space propagation based delay lines, the architecture of which typically incorporates polarizing beam splitters and prisms. These techniques may also be used for providing the true-time delays required for optical beam steering. However, these techniques are also costly and complex.

A true time delay feeder for phased array antenna has been proposed by Corral et al. in "Continuously Variable True Time Delay Feeder for Phased Array Antenna Employing Chirped Fiber Gratings", IEEE Trans. Microwave Theory and Tech., vol. 45(8), 1997, p.1531, and in "True Time-Delay Scheme For Feeding Optically Controlled Phased-Array Antennas Using Chirped Fiber Gratings", IEEE Phot. Tech. Lett., vol 9(11), 1997, p. 1529. In the system described by Corral et al., each element of the antenna is fed by an individually-tunable optical carrier modulated by the microwave signal. The carrier passes through a dispersive element, a chirped fiber grating, which introduces a delay. The delay for each antenna element is controlled by tuning the corresponding optical carrier. As indicated above, this technique for RF phased arrays can be applied for a multiple aperture optical beam steerer. The true time delay feeder described by Corral et al, however, requires a large number of independently tunable sources (equal to the number of elements in the array). Moreover, for some applications, just as many modulators may be required. Thus, an optical beam steerer according to the teachings of Corral et al. amounts to a complicated and cumbersome system.

Hence, a need exists in the art for a true-time delay generator for multiple aperture optical beam steering. Thus, it is desirable to provide a method and apparatus for optical true-time delay generation that is relatively simple and easy to implement and assemble. In addition, it is desirable to provide such a true-time delay generator through the use of off-the-shelf parts and technologies.

SUMMARY OF THE INVENTION

It is therefore an object of the present invention to provide a method and apparatus for providing a true-time delay generator for multiple aperture optical beam steering. It is a further object of the present invention to provide a true-time delay generator that is simple and easy to assemble. It is still a further object of the present invention to provide a true-time delay generator that can be provided through the use of off-the-shelf technologies and parts.

Pursuant to the present invention, a true-time delay generator is provided by a single spectrum broadening element, a single dispersive element, and a plurality of tunable optical filters. The single spectrum broadening element and dispersive element allow a single laser source and modulator to be used to drive the true-time delay generator. The tunable filters are individually controlled such that the outputs of the filters comprise optical pulses with different delays. The pulses may be directed to a multiple aperture optical system, which transmit the pulses in a specified direction. Synchronization of the transmitted pulses at a receive point is achieved by controlling the delay applied to the pulses for each individual aperture.

A method of optical true-time delay generation according to the present invention is provided by the steps of: providing a stream of optical pulses; broadening each pulse in the stream in the spectral domain, preferably to a near top hat shaped spectrum; dispersing each pulse in the stream in the time domain; splitting the stream of pulses into several streams of pulses; and filtering each stream so as to select a different spectral component in each stream. Selection of different spectral components provides streams of pulses which have different delays with respect to each other. Control of the filtering provides control over the delays for each stream. The delayed streams of pulses may be amplified and radiated by a multiple-aperture optical radiator, or may be converted to radio frequency pulses for radiation by a multiple-aperture antenna.

DETAILED DESCRIPTION OF PREFERRED EMBODIMENTS

Figure 1:
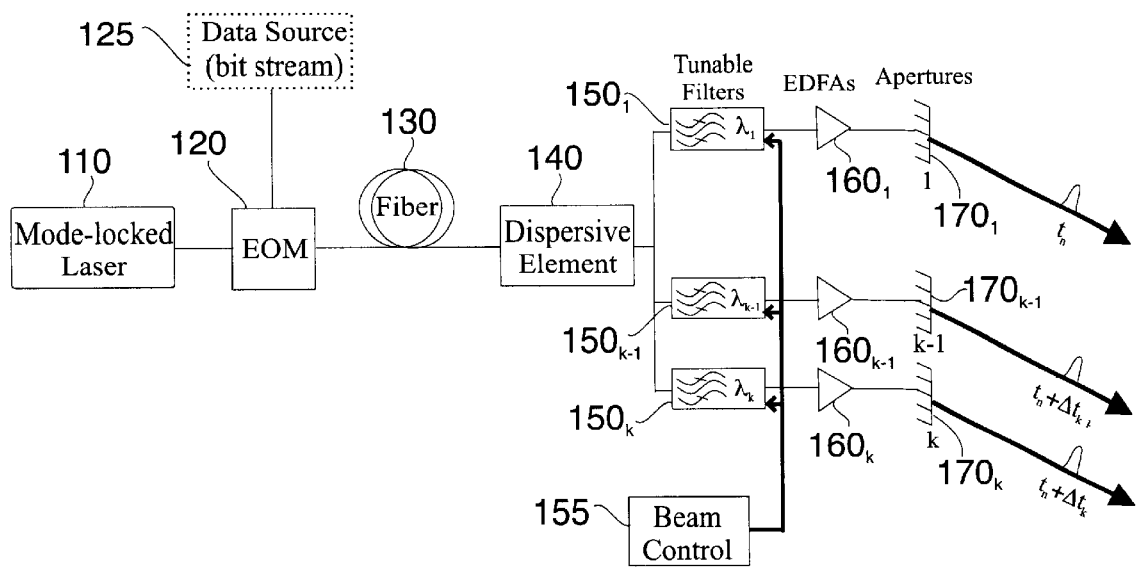
FIG. 1 shows a block diagram of an optical true-time delay beam steering system according to the present invention
Figure 2:
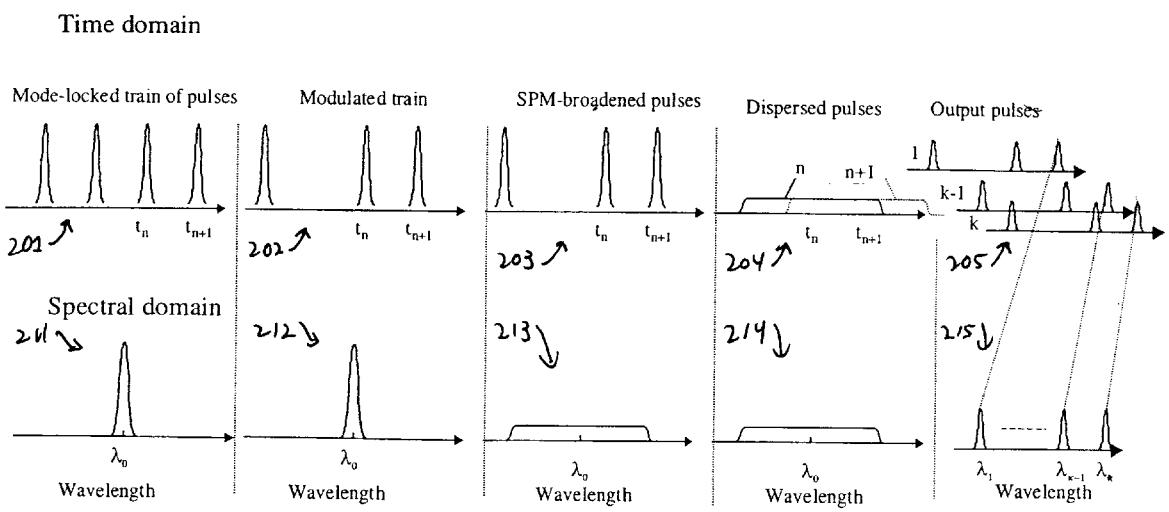
FIG. 2 shows the transformation of optical pulses in both the time and spectral domains as they propagate through the optical true-time delay beam steering system shown in FIG. 1

A block diagram of a preferred embodiment of the present invention is shown in FIG. 1. A mode-locked laser 110 generates a train of optical pulses, whose temporal and spectral properties are illustrated in FIG. 2. In FIG. 2, the time domain representation of the optical pulses is shown at 201, while the spectral domain representation is shown at 211. Mode-locked lasers are well known in the art and are commercially available from several sources, e.g., Pritel Inc. of Naperville, Ill.

In FIG. 1, a data source 125 provides a data signal in either a digital bit stream or an analog waveform. The data signal is modulated onto the train of pulses in a modulator 120. The modulator typically comprises an electro-optic modulator (EOM), which is well known in the art. However, other modulators such as electro-absorption or acoustic modulators, which are also well known in the art, may also be used. FIG. 2 shows the train of pulses modulated by digital on-off keying at 202 for illustrative purposes only. Other pulse modulation schemes known in the art may also be used. Commercial optical amplitude and optical phase modulators are manufactured by many vendors, e.g., by JDS Uniphase of San Jose, Calif. The modulation process affects the pulses mostly in the time domain, as shown by 202, whereas, in the spectral domain, the modulation process only causes minor changes to occur, as shown by 212.

The modulated pulses then pass through some length of optical fiber 130 where they are spectrally broadened via self-phase modulation (SPM). The length of optical fiber to be used depends upon the amount of SPM desired. SPM creates a gradual shift in frequency (also known in the art as a "chirp") over the whole duration of each pulse. The "chirped" pulse has long wavelengths at its beginning and shorter wavelengths at its end. Preferably, the SPM fiber 130 should have small positive (i.e., non-soliton) dispersion. A small positive dispersion in the SPM fiber 130 provides that the temporal shape of the pulses, as shown at 203, is not significantly altered, whereas their spectral shape broadens to a nearly top-hat shape, as shown at 213. SPM fibers, e.g., certain models of Lucent TrueWave fibers, are commercially available. The spectral width of each output pulse (Full Width Half Maximum) is given approximately by:

$$\Delta \lambda_{SPM} = \Delta \lambda_0 \frac{2\pi n_2 L}{A_{eff} \lambda} I_p$$

where $\Delta \lambda_0 = 0.441 \lambda^2/c\tau$ is the spectral width of the original (Gaussian) pulse of duration $\tau$, $n_2 \approx 2.6 \times 10^{-20}$ m$^2$/W is non-linear refractive index, $A_{eff} = 5.5 \times 10^{-11}$ m$^2$ is effective area of the fiber core, $I_p$ is the peak intensity, L is the length of the SPM fiber, and $\lambda$ is the optical transmission wavelength. Assuming $\tau \approx 3$ picoseconds, pulse repetition rate (PRF)=10 GHz, L=500 m, $\lambda$=1550 nm (one of the standard optical transmission wavelengths) and an average power of 100 mW, the spectral width of the original pulse, $\Delta \lambda_0$=1 nm and the spectral width of the SPM broadened pulse, $\Delta \lambda_{SPM}$=10 nm.

Other means may be used to spectrally broaden the optical pulses, such as modulation by a broadband signal. However, use of an SPM fiber is preferred due to its relatively low cost and capability to provide spectral broadening without requiring active components. The present invention does not require that the temporal shape of the optical pulses before broadening be Gaussian. Other pulse shapes may be used, although the amount of spectral broadening provided by SPM fiber will vary depending upon the temporal pulse shape.

Figure 3:
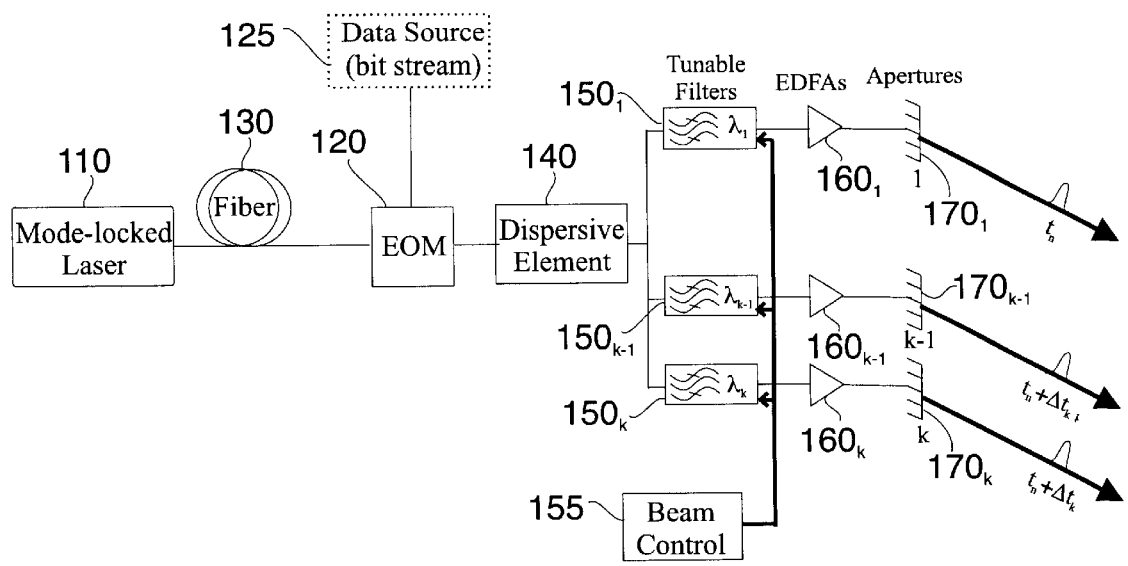
FIG. 3 shows a block diagram of an alternative embodiment of the present invention where pulse modulation is performed after the optical pulses have been spectrally broadened.

Modulation of the optical pulses may also occur after the train of pulses from a mode-locked laser are spectrally broadened. An embodiment of the present invention where spectrally broadened pulses are modulated is shown in FIG. 3. This embodiment reduces the effects that spectral broadening has on the modulated signal, since pulse modulation is performed after spectral broadening of the optical pulses has occurred.

The SPM broadened pulses, whether created as shown in FIG. 1 or 3, are then dispersed by a dispersive element 140, such as fiber with high dispersion or a chirped fiber grating. When a chirped fiber grating with dispersion D=100 ps/nm is used as the dispersion element, the dispersed pulses have duration of $\tau_D=1$ ns and a nearly top-hat temporal shape, as shown at 204 in FIG. 2. The same result may be achieved with L=3 km of regular telecommunication fiber, e.g., Coming SMF28, that has dispersion of D/L=30 ps/nm x km. Therefore, either a chirped fiber grating or a proper length of telecommunications fiber may be used as the dispersive element 140. The spectral width of each pulse does not change substantially due to the dispersion, as shown at 214. However, the dispersive element delays red-shifted components of the pulse spectrum by a considerably larger amount than the blue-shifted components (or vise versa, depending on the dispersion sign).

The dispersed pulses are approximately ten times longer than the pulse-to-pulse period. This, however, is not a point of concern, as discussed below. The pulses are severely chirped, i.e., the leading edge of the pulse contains shorter optical wavelengths, whereas the trailing edge carries longer ones. As a result, in any given time slot, each pulse has a spectrally distinctive component, whose central wavelength is different from that of any other pulse. Hence, while the entire width of a broadened pulse may overlap with other pulses in time, the spectral components of a pulse are distinct and separate from the spectral components of other pulses at each point in time.

The optical signal consisting of broadened pulses is provided to a plurality of individually controlled optical filters $150_1 \ldots 150_k$. Each filter $150_1 \ldots 150_k$ transmits only one spectral component of each pulse, whose location on the time scale is fully determined by its central wavelength. Since other pulses contain different spectral components in the same time slot, they are blocked by the filter $150_1 \ldots 150_k$. The true time-delay in each channel is controlled by tuning the corresponding optical filter $150_1 \ldots 150_k$. Tunable Fabry-Perot optical filters with a wavelength resolution of 0.1–1 nm and the tuning range of up to 30 nm are known in the art and are readily available, such as Fiber Fabry-Perot Tunable Filters from Micron Optics, Inc of Atlanta, Ga. Typical tuning speed of these filters is on the order of tens of milliseconds. Analog or digital controls may be used to tune the filters.

Tunable optical filters other than Fabry-Perot filters may be used, such as filters based on grating monochromators or fiber-stretched gratings. However, tunable Fabry-Perot filters are preferred due to their tuning speed and range, wavelength resolution, and ease of use. The optical filters will naturally affect the spectral shape of the optical pulses, which will, in turn, have some effect on the temporal shape of the filtered pulses. However, the overall effect is that the pulses transmitted through each filter will have a different temporal position with respect to the pulses transmitted through other filters.

The spectrally filtered pulses are preferably amplified in an Er-Doped Fiber Amplifier (EDFA) $160_1 \ldots 160_k$. The amplified pulses are then sent to corresponding apertures $170_1 \ldots 170_k$ for radiation, which comprise one means for radiating the time delayed pulses. The maximum true time-delay achieved with the present invention is determined by the time duration of the dispersed pulses, which is equal to $\tau_D=1$ ns in the given example. This maximum delay is sufficient for feeding a multiple aperture optical array of 30 cm diameter that steers an optical beam within a hemisphere. Multiple aperture arrays of smaller sizes require proportionally smaller durations of the top-hat pulses or dispersive elements with smaller dispersion, e.g., shorter length of dispersive fiber. Smaller durations or smaller dispersion are even easier to achieve. In fact, miniature arrays may not require SPM pulse broadening at all, since the original spectrum of the mode-locked pulses may already contain all the required spectral components.

The wavelength to which each tunable filter $150_1 \ldots 150_k$ is tuned determines the delay acquired by the optical pulses output by each filter. The required delay is dependent upon the spacing between the apertures $170_1 \ldots 170_k$ and the angle at which the optical beam is steered. A beam control unit 155 provides individual control signals to each tunable filter $150_1 \ldots 150_k$ to tune each filter to the correct wavelength for the desired beam steering angle. The required wavelengths for each filter can be pre-calculated, allowing a matrix of wavelength values to be stored in a memory, such that a look-up table can be used to determine the wavelength required for each tunable filter for a specified optical beam angle.

The delay δt required between each aperture is given by:

$$\delta t = \frac{d \sin\theta}{C}$$

where d is the distance between each aperture element, θ is the angle to which the optical beam is to be steered, and C is the speed of light. The present invention provides individual tunable optical filters for each aperture element, so the aperture elements do not have to be equally spaced to provide the required optical beam steering.

The present invention accommodates pulse modulation techniques with no upper bound on the pulse repetition frequency (PRF) used in modulating the pulses. However, specific hardware used in implementing the present invention may limit the PRF upper bound. Note also that the effectiveness of the invention is limited when the PRF is less than C/D, where C is the speed of light and D is the total diameter of the apertures $170_1 \ldots 170_k$.

Figure 4:
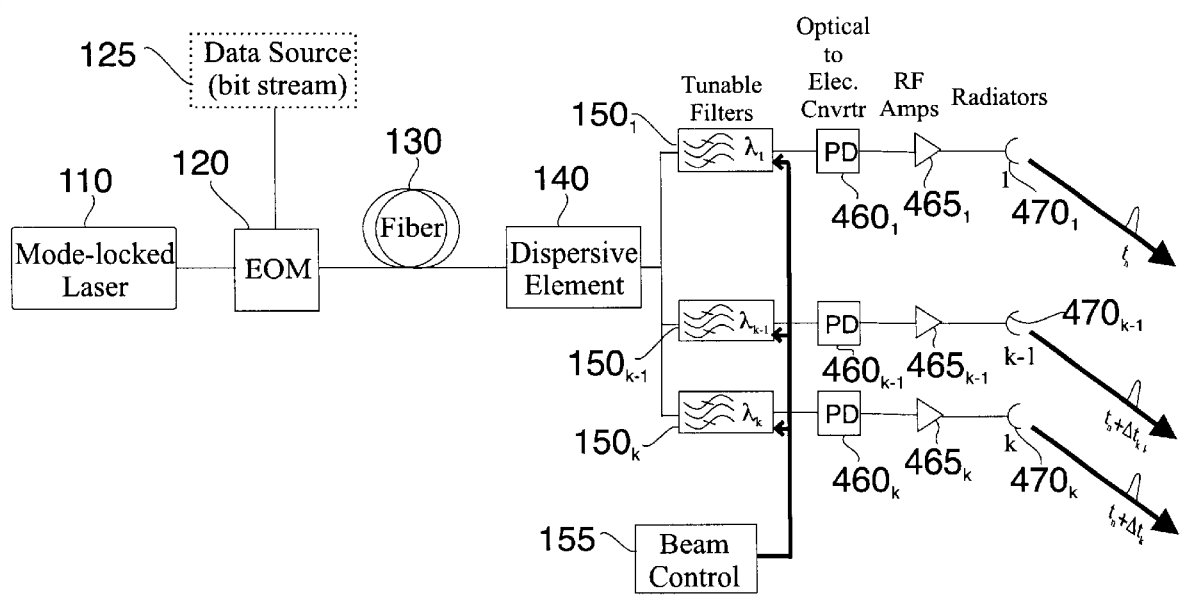
FIG. 4 shows a block diagram of an alternative embodiment of the present invention where time delayed RF pulses are radiated.

An additional embodiment of the present invention may be used to radiate radio-frequency (RF) pulses, as shown in FIG. 4. In FIG. 4, the time-delayed pulses output from the tunable filters $150_1 \ldots 150_k$ are sent to optical-to-electrical converters $460_1 \ldots 460_k$, such as photo diodes for conversion to RF pulses. The RF pulses may be amplified with RF amplifiers $465_1 \ldots 465_k$ and radiated with RF radiators $470_1 \ldots 470_k$, such as antenna elements with a phased antenna array.

From the foregoing description, it will be apparent that the present invention has a number of advantages, some of which have been described above, and others of which are inherent in the embodiments of the invention described above. Also, it will be understood that modifications can be made to the method and apparatus of true-time delay generation described above without departing from the teachings of subject matter described herein. As such, the invention is not to be limited to the described embodiments except as required by the appended claims.

What is claimed is:

1. An optical true-time delay generator apparatus for multiple aperture beam steering, said apparatus comprising:

means for spectrally broadening optical pulses, said means receiving optical pulses and providing broadened optical pulses;

means for time dispersing said broadened optical pulses, said means for time dispersing providing dispersed pulses; and means for filtering different spectral components of said dispersed pulses, said means for filtering different spectral components providing a plurality of time-delayed pulses.

2. An optical true-time delay generator apparatus according to claim 1 further comprising a means for modulating optical pulses, said means for modulating optical pulses receiving optical pulses and providing modulated optical pulses to said means for spectrally broadening optical pulses.

3. An optical true-time delay generator apparatus according to claim 1 further comprising a means for modulating optical pulses, said means for modulating optical pulses receiving spectrally broadened pulses from said means for spectrally broadening optical pulses and providing modulated optical pulses to said means for time dispersing.

4. An optical true-time delay generator apparatus according to claim 1 further comprising means for radiating said time-delayed pulses.

5. An optical true-time delay generator apparatus according to claim 1 wherein said means for spectrally broadening optical pulses comprises self-phase modulation fiber.

6. An optical true-time delay generator apparatus according to claim 1 wherein said means for time dispersing comprises a chirped fiber grating.

7. An optical true-time delay generator apparatus according to claim 1 wherein said means for time dispersing comprises optical telecommunications fiber.

8. An optical true-time delay generator apparatus according to claim 1 wherein said means for filtering different spectral components comprises a plurality of tunable filters.

9. An optical true-time delay generator apparatus according to claim 8 wherein the plurality of tunable filters comprises a plurality of tunable Fabry-Perot filters.

10. An optical true-time delay generator apparatus according to claim 1 further comprising means for amplifying said plurality of time-delayed pulses.

11. The optical true-time delay generator apparatus according to claim 1, wherein each broadened optical pulse of said broadened optical pulses comprises a chirped optical pulse having a gradual shift in frequency over the duration of said chirped optical pulse with longer wavelengths at the beginning of said chirped optical pulse and shorter wavelengths at the end of said chirped optical pulse.

12. An optical true-time delay generator apparatus for multiple aperture beam steering, said apparatus comprising:
   an optical spectrum broadener receiving optical pulses and providing spectrally broadened pulses;
   a dispersive element receiving said spectrally broadened pulses and providing dispersed pulses; and
   a plurality of tunable optical filters receiving said dispersed pulses, each of said tunable filters tuned to transmit a different spectral component of said dispersed pulses and block all other spectral components, said plurality of tunable optical filters producing a plurality of time-delayed pulses.

13. An optical true-time delay generator apparatus according to claim 12, further comprising an optical pulse modulator receiving said optical pulses and an analog signal, said optical pulse modulator modulating said optical pulses according to said analog signal to produce modulated optical pulses, said modulated optical pulses being provided to said optical spectrum broadener.

14. An optical true-time delay generator apparatus according to claim 12, further comprising an optical pulse modulator receiving aid broadened optical pulses and an analog signal, said optical pulse modulator modulating said broadened optical pulses according to said analog signal to produce modulated optical pulses, said modulated optical pulses being provided to said dispersive element.

15. A optical true-time delay generator apparatus according to claim 12, further comprising a plurality of optical amplifiers, said plurality of optical amplifiers receiving said plurality of time-delayed pulses and producing a plurality of amplified pulses.

16. An optical true-time delay generator apparatus according to claim 12, further comprising a plurality of optical apertures, said plurality of optical apertures radiating said time-delayed pulses.

17. An optical true-time delay generator apparatus according to claim 12, wherein said optical spectrum broadener comprises self-phase modulation fiber.

18. An optical true-time delay generator apparatus according to claim 12, wherein said dispersive element comprises a chirped fiber grating.

19. An optical true-time delay generator apparatus according to claim 12, wherein said dispersive element comprises optical telecommunications fiber.

20. An optical true-time delay generator apparatus according to claim 12, wherein said plurality of tunable optical filters comprises a plurality of tunable Fabry-Perot optical filters.

21. An optical true-time delay generator apparatus according to claim 12, further comprising a plurality of optical-to-electronic converters receiving said plurality of time-delayed pulses and radiating said pulses as radio frequency pulses.

22. The optical true-time delay generator apparatus according to claim 12, wherein each spectrally broadened pulse of said spectrally broadened pulses comprises a chirped optical pulse having a gradual shift in frequency over the duration of said chirped optical pulse with longer wavelengths at the beginning of said chirped optical pulse and shorter wavelengths at the end of said chirped optical pulse.

23. A method for true time delaying an optical signal for use in multiple aperture beam steering, said method comprising the steps of:
   providing a stream of optical pulses;
   broadening a spectrum of each pulse in said stream of optical pulses to provide a stream of spectrally broadened optical pulses;
   dispersing each pulse within said stream of spectrally broadened optical pulses to provide a stream of dispersed pulses;
   splitting said stream of dispersed pulses into a plurality of streams of dispersed pulses; and
   filtering separately each stream in the plurality of streams of dispersed pulses.

24. The method according to claim 23, further comprising the step of modulating cach pulse within said stream of optical pulses with data from a data source before performing the step of broadening a spectrum of each pulse.

25. The method according to claim 23, further comprising the step of modulating each pulse within said stream of spectrally broadened optical pulses with data from a data source before performing the step of dispersing each pulse.

26. The method according to claim 23, further comprising the step of amplifying each stream of dispersed pulses.

27. The method according to claim 23, further comprising the step of transmitting each stream of dispersed pulses from an optical radiating element.

28. The method according to claim 23, wherein the step of broadening a spectrum of each pulse comprises transmitting each pulse into a self-phase modulating fiber.

29. The method according to claim 23, wherein the step of dispersing each pulse comprises transmitting such pulse into chirped fiber grating.

30. The method according to claim 23, wherein the step of dispersing each pulse comprises transmitting each pulse into an optical telecommunications fiber.

31. The method according to claim 23, wherein the step of filtering separately each stream comprises transmitting each stream into a separate tunable filter.

32. The method according to claim 31, wherein the tunable filter comprises a tunable Fabry-Perot filter.

33. The method according to claim 23, wherein each spectrally broadened optical pulse in said stream of spectrally broadened optical pulses comprises a chirped optical pulse having a gradual shift in frequency over the duration of said chirped optical pulse with longer wavelengths at the beginning of said chirped optical pulse and shorter wavelengths at the end of said chirped optical pulse.

34. An optical beam steerer comprising:
   an optical pulse source producing a stream of optical pulses;
   an optical pulse chirper receiving said stream of optical pulses and producing a stream of chirped optical pulses modulated with an analog or digital signal, each optical pulse in said stream of optical pulses having a gradual shift in frequency over the duration of each optical pulse with longer wavelengths at the beginning of each optical pulse and shorter wavelengths at the end of each optical pulse;
   a dispersive element receiving said stream of chirped optical pulses and producing a stream of dispersed optical pulses, wherein different wavelength components of each optical pulse in said stream of dispersed optical pulses are delayed by different amounts of time;
   a splitter receiving said stream of dispersed optical pulses and producing a plurality of streams of dispersed optical pulses;
   a plurality of tunable optical filters, each tunable optical filter of said plurality of tunable optical filters receiving one stream of dispersed optical pulses of said plurality of streams of dispersed optical pulses; and
   a plurality of array elements, each array element of said plurality of array elements coupled to one tunable optical filter of said plurality of array elements.

35. The optical beam steerer of claim 34, wherein each tunable optical filter comprises an optical bandpass filter having a controllable range of transmitted wavelengths and each tunable optical filter being individually controlled to transmit a selected range of transmitted wavelengths based on a desired array angle.

36. The optical beam steerer of claim 34 wherein said optical pulse chirper comprises:
   an optical modulator controlled by said analog or digital signal, said optical modulator receiving said stream of optical pulses and producing a stream of modulated optical pulses; and
   an optical spectrum broadener receiving said stream of modulated optical pulses and producing said stream of chirped optical pulses, wherein each optical pulse in said stream of chirped optical pulses has a spectral width larger than a corresponding optical pulse in said stream of modulated optical pulses.

37. The optical beam steerer of claim 34, wherein said optical pulse chirper comprises:
   an optical spectrum broadener receiving said stream of optical pulses and producing a stream of broadened optical pulses, wherein each optical pulse in said stream of broadened optical pulses has a spectral width larger than a corresponding optical pulse in said stream of optical pulses,
   an optical modulator controlled by said analog or digital signal, said optical modulator receiving said stream of broadened optical pulses and producing said stream of chirped optical pulses.

38. The optical beam steerer of claim 34, wherein at least one array element comprises:
   an optical amplifier; and
   an optical aperture.

39. The optical beam steerer of claim 34, wherein at least one array element comprises:
   an optical-to-electrical converter;
   an electrical amplifier; and
   an antenna element.

* * * * *